Nov. 7, 1933.  W. McCOLLUM  1,934,135
SPLASH GUARD
Filed Aug. 1, 1931

INVENTOR
WILLIAM McCOLLUM
BY Chas. Lyon Russell
HIS ATTORNEY

Patented Nov. 7, 1933

1,934,135

UNITED STATES PATENT OFFICE 1,934,135

SPLASH GUARD

William McCollum, Rahway, N. J., assignor to Tingley-Reliance Rubber Corporation, Rahway, N. J., a corporation of New Jersey Application August 1, 1931. Serial No. 554,463

6 Claims. (Cl. 280—152)

This invention relates to splash guards for application particularly to the lower rear ends of wheel fenders of automobiles. It is designed to provide a strong device of this character having a flexible apron and yieldable, self-cushioned attaching devices carried by the apron.

In the preferred embodiment of my invention the apron is formed of rubber and the attaching jaws of spring steel.

The principal object of my invention is to provide a splash guard which may be readily and securely attached to the fender of an automobile without marring the material of the fender or its finish.

Another object of the invention is to provide cushioned, spring jaws capable of securely attaching the device in position in such manner that blows administered to various parts of the apron and the jaws and the effort of pulling and tugging will not loosen their hold nor mar the fender.

Another object of the invention is to provide holding means for a device of this character located on the outer side of the apron so that when the device is in position on the fender its inner side, that is the side toward the wheel, is practically free and the upper edge of the apron is held in close proximity to the inner face of the fender.

My present design of splash guard, by reason of the fact that it engages the lower rear edge of the fender rather than the sides of the fender toward the end as heretofore, enables me to make the apron itself considerably shorter in length although depending the same amount as heretofore below the fender.

In the accompanying drawing one practicable embodiment of my invention is illustrated, in which drawing.

My present invention is an improvement of a device which is quite generally mounted on the rear ends of fenders of automobiles for guarding various parts of the vehicle from the spatters thrown out by the wheels, and is closely related to the device set forth in the application of Walter C. Jackson for Letters Patent of the United States, filed August 5, 1930, Serial No. 473,225. In the Jackson device the clamping jaws are preferably formed of vulcanized rubber and may be reinforced by a spring embedded in them for giving them form and reinforcing the bead engaging lip. In the present invention the jaws of the clamp and the cushioning features are afforded by a naked spring construction preferably formed of spring steel. Of course it is to be understood that the spring will either be made of some rust proof material or will be treated to prevent rust.

My present improvement relates to a device of this character in which the attaching means secured to a flexible apron are in the form of sturdy jaws designed to act on the fish-hook principle for assuring a permanent attachment of the splash guard to the fender of an automobile.

The splash guard, in its present illustrated form, is assumed to be made of vulcanized rubber and comprises a flexible apron 5 formed at the side with a flexible but reinforcing bead 6. The upper edge of the apron is substantially straight at the major portion, but is shown formed at the sides with upstanding ears 7.

Figure 1:
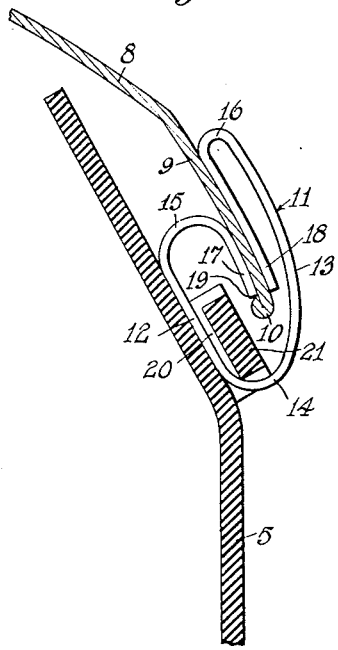
Figure 1 shows in enlarged vertical section a portion of the device attached to the lower end of the fender of an automobile.
Figure 2:
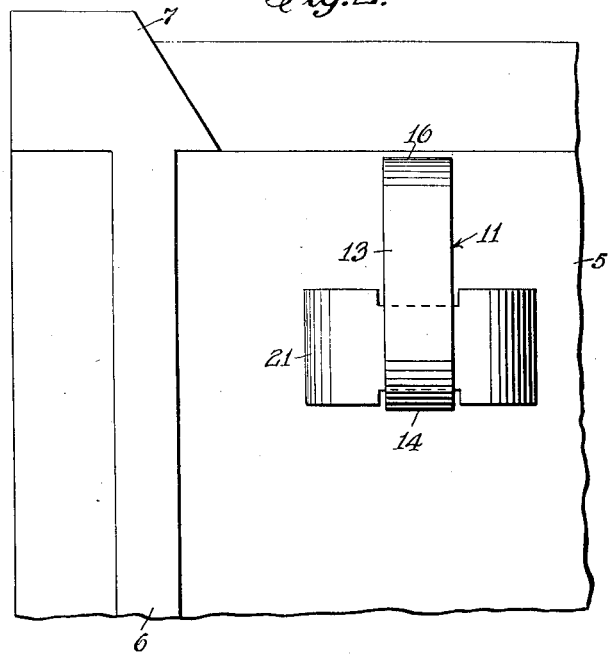
Fig. 2 shows a portion of the rear outer face of the device.

In Figure 1 there is illustrated a portion of a fender 8, the conventional structure of which at the present time, is sheet metal. The rear end 9 of the fender is shown curving outwardly and downwardly, which downwardly curving portion ends in a reinforcing inturned bead 10. To this portion of the fender there is shown mounted my improved splash guard.

The clamp 11 comprises a U-shaped body portion having uprights 12 and 13 united by the bow 14, the uprights being bent over inwardly at 15 and 16 and continuing into jaws 17 and 18. The upright 13 extends upwardly a considerable distance beyond the bend 15 of the upright 12, the jaw 18 also commencing above the jaw 17 and extending downwardly substantially as far as the extreme end 19 of such jaw.

The clamp is shown threaded through an opening 20 formed in a loop or boss 21 vulcanized on the face of the apron.

The loop 21 is shown resting on the bow portion 14 of the clamp, the major portion of the upright 12 lying behind the loop and between it and the apron. When in use the weight of the apron serves to hold the loop well down in the bow portion 14 of the U. The upright 13 and the jaw 18, being longer than the upright 12 and jaw 17, are consequently more resilient than are these latter parts.

Figure 3:
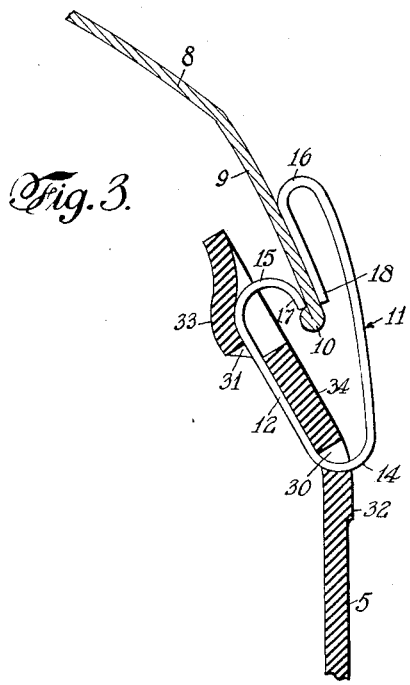
Fig. 3 is an enlarged vertical section of a modification.

For use in some situations the clamp 11, substantially of the form shown in Fig. 1, may be threaded through a pair of openings 30 and 31 formed in the apron, this being illustrated in Fig. 3. The apron is preferably reinforced at this region, it being shown thickened at 32. The bow portion 14 of the clamp is shown disposed in the opening 30, the major portion of the upright 12 lying behind the apron and extending through the opening 31. The rear of the extreme upper end of the upright 12 and the adjacent portion of the bend 15 engage the apron above the opening and stretch this away from its true plane as at 33. The reaction of this apron stretching serves to sustain and stiffen the clamp and to hold the jaw 17 well forward of the front face 34 of the apron. When in use the weight of the apron serves to hold it well down in the bow portion 14 of the U.

In applying this device to an automobile fender the bead 10 at the lower part of the fender is pressed into the V-shaped notch 25 between the jaws 17 and 18, upward pressure being then applied to the clamp forcing the bead between the jaws. Owing to the resilient character of the jaw 18 and its supporting upright 13 this readily bends away from the other jaw and permits the entrance of the bead and the part 9 of the fender. The extreme end 19 of the jaw 17 enters behind the bead and upon application of a slight downward pull on the apron the parts act somewhat in the nature of a fish-hook which holds the clamp securely in position on the fender.

The resiliency of the jaw 18 gives the clamp a cushioning effect, especially where it engages the outward finished surface 26 of the fender. At this point it might not be amiss to say that the terms "front face" and "rear face", as applied to the apron, refer to these as they are observed by one applying the device to a fender and have no reference to the contemplated direction of travel of the vehicle which carries the fender.

It is quite apparent that both the weight of the device itself and any load applied incident to pulling or tugging on the apron is directly borne by the extreme portion 19 of the hook shaped jaw 17 and that pulling or downward pressure on the apron or on the clamp itself will not release the grip of the jaw.

Although in this application but one form of my invention is illustrated, which I regard at the present time as the preferred form, yet it will be apparent that changes may be made within the scope of the claims without departing from the spirit of the invention.

Having thus described my invention, I claim and desire to secure by Letters Patent:

1. An automobile fender splash guard comprising a flexible apron carrying near its upper end a pair of loops, and clamping devices formed of spring material threaded through the openings of such loops and each having a portion constructed and adapted to embrace a bead at the lower edge of the fender, and a portion located in position to press into the corner formed between the bead and the inner face of the fender.

2. An automobile fender splash guard comprising a flexible apron carrying near its upper end a pair of loops, and clamping devices formed of spring material threaded through the openings of such loops and each having a portion constructed and adapted to embrace a bead at the lower edge of the fender, and an end located in position to press into the corner formed between the bead and the inner face of the fender, the clamping device also having a portion constructed and adapted to engage the fender on the face opposite to that engaged by the said end.

3. A splash guard comprising a flexible apron and a pair of cushioned attaching clamps secured to the apron and projecting beyond one face thereof, each of the clamps embodying a naked steel spring formed into a pair of jaws, one of the jaws being directed away from the apron face upon which the clamp is carried and having a portion for engaging a bead at the lower end of the fender, and the other of the jaws being bent over inwardly at its end forming an end cushion for engaging the fender upon the opposite side.

4. An automobile fender splash guard comprising a flexible apron having formed in it near its upper end a loop, and a clamping device formed of naked spring steel and comprising a U-shaped body portion having a bow and a pair of uprights, one of the uprights being bent over inwardly and downwardly and having a fender engaging end, the other of the uprights extending upwardly a considerable distance beyond the bend of the other upright and there bent over and continuing downwardly substantially as far as said fender engaging end, the clamp having its shorter end threaded through the said loop and such loop resting in the bow of the U-shaped body portion.

5. An automobile fender splash guard comprising a flexible apron having formed in it near its upper end a pair of openings one above the other, and a clamping device formed of spring material threaded through such openings and having a portion constructed and adapted to embrace a bead at the lower edge of the fender, and a portion located in position to press into the corner formed between the bead and the inner face of the fender.

6. An automobile fender splash guard comprising a flexible apron having formed in it near its upper end a pair of openings one above the other, and a clamping device formed of naked spring steel and comprising a U-shaped body portion having a bow and a pair of uprights, one of the uprights being bent over inwardly and downwardly and having a fender engaging end, the other of the uprights extending upwardly a considerable distance beyond the bend of the other upright and there bent over and continuing below the said fender engaging end, the clamp having its shorter end threaded through the openings in the fender, the wall of one of such openings resting in the bow of the U-shaped body portion.

WILLIAM McCOLLUM.